United States Patent Office 3,781,430
Patented Dec. 25, 1973

3,781,430
DIURETIC FORMULATIONS
Edward J. Cragoe, Jr., Lansdale, Pa., assignor to
Merck & Co., Inc., Rahway, N.J.
No Drawing. Continuation-in-part of application Ser. No. 800,260, Feb. 18, 1969, which is a continuation-in-part of application Ser. No. 538,532, Feb. 7, 1966, both now abandoned, which is a continuation-in-part of application Ser. No. 313,315, Oct. 7, 1963, now Patent No. 3,313,813, which in turn is a continuation-in-part of abandoned application Ser. No. 234,230, Oct. 30, 1962. This application Dec. 21, 1971, Ser. No. 210,577
Int. Cl. A61k 27/00
U.S. Cl. 424—246                    6 Claims

ABSTRACT OF THE DISCLOSURE

A potassium conserving diuretic, (3,5-diamino-6-chloropyrazinoyl)guanidine hydrochloride, is co-administered with a potassium excreting diuretic (ethacrynic acid and hydrochlorothiazide) to avoid hypokalemia in patients.

---

This application is a continuation-in-part of U.S. application Ser. No. 800,260, filed Feb. 18, 1969, now abandoned, which, in turn, is a continuation-in-part of U.S. application Ser. No. 538,532, filed Feb. 7, 1966, now abandoned, which, in turn, is a continuation-in-part of U.S. application Ser. No. 313,315, filed Oct. 7, 1963 (U.S. Pat. No. 3,313,813), which, in turn, is a continuation-in-part of U.S. application Ser. No. 234,230, filed Oct. 30, 1962, now abandoned.

The present invention relates to pharmaceutical formulations and particularly to preparations which have advantageous diuretic and/or saluretic properties. For simplicity, the word diuretic is hereafter used in a common or generic sense, to apply to drugs which cause diuresis (increased urine excretion) and/or saluresis (increased electrolyte excretion).

Diuretics are valuable therapeutic agents as they are useful in the treatment of cardiovascular and renal diseases. Their use is indicated in the management of all types and grades of severity of congestive heart failure in which diuretic therapy improvement is required. Due to the resulting loss of water an electrolyte dramatic improvement is noted in peripheral and pulmonary edema, dyspnea, orthopnea, cough, ascites and pleural effusion.

These drugs also provide effective therapy in various forms of renal edema, e.g., edema associated with nephrosis and certain types of nephritis. Their administration results in prompt excretion of retained fluid and electrolytes with consequent benefit to the patient. The desired electrolye to be excreted is sodium chloride.

Although diuretics are often life-saving because of the above beneficial therapeutic effects, most of them have the disadvantage of causing the excretion of appreciable amounts of potassium ions. When an excessive loss of potassium ions occurs a severe muscular weakness and feeling of extreme physical exhaustion results. The patient eliminates the unwanted sodium ions due to the action of the diuretic drugs but the undesired elimination of the potassium ions produces an imbalance that should not be allowed to persist.

The invention involves the co-administration of a pyrazinoylguanidine compound with one of the above-mentioned potassium eliminating diuretics to thereby result in a reduction in the amount of potassium ions that are eliminated, without a reduction in the amount of sodium ions that are eliminated. In fact, more sodium ions are eliminated than would be forecast from a knowledge of the natiuretic effects of the individual drugs. The co-administration of these drugs therefore results medically in a synergistic therapeutic accomplishment.

One class of the newer diuretics includes a group of [2-alkylidenealkanoyl)phenoxy]acetic acids and a specific one is known as ethacrynic acid. Chemically, it is [2,3 - dichloro - 4 - (2 - methylenebutyryl)phenoxy]acetic acid, and its use has been reported in journal articles. Although ethacrynic acid is the preferred one of the phenoxyacetic acid class of diuretics, the invention contemplates the use in its place of any of the following related compounds:

[3-chloro-4-(2-methylenebutyryl)phenoxy]acetic acid,
[2,3-dimethyl-4-(2-methylenebutyryl)phenoxy]acetic acid,
2,3-dichloro-4-(2-ethylidenebutyryl)phenoxy]acetic acid.

Another ethacrynic acid related diuretic in which a 1,3-butadienylene group (—CH=CH—CH=CH—) is fused to adjacent carbon atoms of the benzene ring (forming a naphthyl nucleus) is: 4-(2-methylenebutyryl)-1-naphthyloxy acetic acid.

A different class of the newer diuretics is the 1,2,4-benzothiadiazines. One of them is hydrochlorothiazide which chemical is 6-chloro-3,4-dihydro-2H-1,2,4-benzodiazine-7-sulfonamide 1,1-dioxide and which is in common use. A related 1,2,4-benzothiadiazine is chlorothiazide which chemically is 6-chloro-2H-1,2,4-benzothiadiazine-7-sulfonamide 1,1-dioxide, which is in common use. Other known 1,2,4-benzothiadiazines include flumethiazide, benzthiazide, cyclopenthiazide, cyclothiazide, trichloromethiazide, benzhydroflumethiazide, hydroflumethiazide, methylclothiazide, polythiazide and thiabutazide.

Other known diuretics which have the disadvantage of causing the excretion of excessive amounts of potassium ions and which therefore lend themselves to inclusion in the combination of this invention are dichlorphenamide, chlorthalidone, 5 - chloro - 2,4 - disulfamylaniline, furosemide, chlorazanil and quinethazone. By co-administering with them a pyrazinoylguanidine compound, the potassium loss which they inherently would cause, is overcome to the extent that potassium depletion is not a problem. This is achieved and the all-important elimination of sodium ions and water is accomplished.

To achieve the beneficial results of this invention, the preferred pyrazinoylguanidine compound is (3,5-diamino-6-chloropyrazinoyl)guanidine hydrochloride (amiloride hydrochloride) which is described in the literature and patented arts. For convenience, the term amiloride hydrochloride is sometimes abbreviated as amiloride. However, in its place may be substituted (3-amino-5-dimethylamino-6-chloropyrazinoyl)guanidine hydrochloride or (3-amino - 5 - dimethylamino-6-chloropyrazinamido)-guanidine hydrochloride.

The synergistic accomplishment achieved in this invention is further substantiated by the clinical studies shown below which were carried out at various ratios of co-administration of the diuretics.

METHOD

These studies were carried out in groups consisting of five (5) to eleven (11) healthy patients who were admitted for observation prior to commencing a three day study period. The patients were given diets which contain by analysis the desired meq. (milliequivalents) of sodium for each of the three days. The amount of fluid intake each day was constant and both meals and fluid were taken at the same time each day. Caffeine-containing substances were completely excluded from the diet. After midnight of the day prior to the experiment, no food or fluid intake was allowed. On the day of the experiment, in order to avoid an excess fluid and salt depletion, a definite quantity of sodium intake was allowed at intervals throughout the 24-hour period. The first day was for equilibration, the second day was a control period and the third day the experiment was commenced. Urine specimens were measured to obtain the meq. of sodium and potassium contained therein.

Urinary electrolyte excretion data at a 10:1 (hydrochlorothiazide or ethacrynic acid to amiloride hydrochloride) ratio (Table I).

TABLE I
Effect of 20 mg. of amiloride on urinary electrolyte excretion

| Meq./24 hrs. | Control | Amiloride | Meq./24 hrs. excretion | Percent |
|---|---|---|---|---|
| Sodium | 150.3 | 285.4 | +135.1 | [1] 90 |
| Potassium | 69.6 | 39.6 | −30 | [2] 43 |
| Na/K | 2.2 | 7.2 | | |

[1] Increase.
[2] Decrease.

This table summarizes the results for sodium and potassium excretion by administering amiloride alone. A single dose of amiloride increased the 24 hour urinary sodium excretion by 135.1 meq. while simultaneously reducing the potassium excretion by 30 meq. The Na/K ratio was increased from 2.2 to 7.2.

TABLE II
Effect of 20 mg. of amiloride on the diuresis caused by ethacrynic acid and hydrochlorothiazide in normal people

| | | Drugs | | | |
|---|---|---|---|---|---|
| | | Ethacrynic acid, 200 mg. | Ethacrynic acid, 200 mg. plus amiloride, 20 mg. | Hydrochlorothiazide, 200 mg. | Hydrochlorothiazide, 200 mg. plus amiloride, 20 mg. |
| Na, meq | 1st 4 hrs. after major diuretic | 155.4 | 217.4 | 122.1 | 128.5 |
| | 1st 8 hrs. after major diuretic | 239.8 | 303.8 | 208.9 | 230.7 |
| | 1st 24 hrs. after amiloride | 274.1 | 363.3 | 320.4 | 373.8 |
| K, meq | 1st 4 hrs. after major diuretic | 45.2 | 17.0 | 28.5 | 11.9 |
| | 1st 8 hrs. after major diuretic | 68.2 | 28.2 | 49.1 | 22.5 |
| | 1st 24 hrs. after amiloride | 103.6 | 48.6 | 90.6 | 54.4 |
| Na/K | 24 hr. value | 2.6 | 7.2 | 3.6 | 7.1 |

This table summarizes the results obtained when ethacrynic acid and hydrochlorothiazide are administered separately and each in combination with 20 mg. of amiloride. In both combinations, the 20 mg. dose of amiloride increased the natiuretic (sodium) effect of 200 mg. of hydrochlorothiazide and 200 mg. of ethacrynic acid by an average of 54 meq. and 80 meq., respectively, in a 24 hour period from its maximum quantity of sodium excretion while simultaneously maintaining an optimum potassium balance.

Urinary electrolyte excretion data at a 5:1 (hydrochlorothiazide to amiloride) ratio (Table III).

Twenty-four hour average mean two-hourly output of hydrochlorothiazide (50 mg.), amiloride hydrochloride (10 mg.) and combination thereof as compared with placebo.

TABLE III

Sodium excretion (meq.)

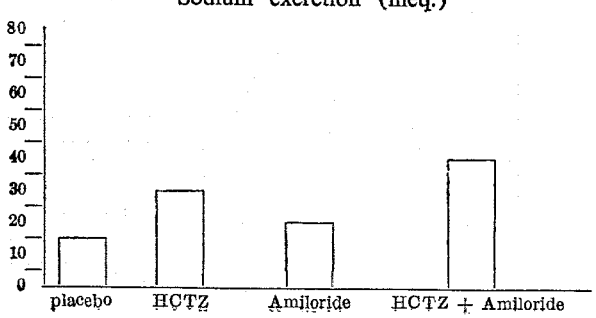

This table sumamrizes the results obtained when hydrochlorothiazide (HCTZ) and amiloride are administered separately and in combination as compared to placebo. Both hydrochlorothiazide and amiloride showed a greater natiuretic response than placebo. The combination of the two drugs resulted in a natiuretic increase significantly greater than placebo and greater than hydrochlorothiazide or amiloride when administered separately.

Potassium excretion (meq.)

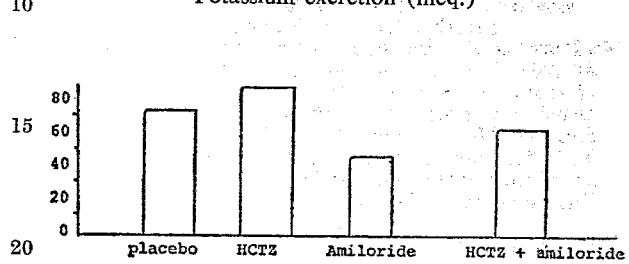

This table summarizes the results obtained when hydrochlorothiazide and amiloride are administered separately and in combination as compared to placebo. Both amiloride and combination thereof (hydrochlorothiazide and amiloride) gave potassium excretion values significantly less than placebo and hydrochlorothiazide when administered separately during the 24-hour period.

Urinary electrolyte excretion data at a 100:30 (hydrochlorothiazide to amiloride) ratio (Table IV).

TABLE IV
Mean diuretic response in 5 subjects to hydrochlorothiazide (100 mg. per day) administered for 5 days followed by hydrochlorothiazide (100 mg. per day) and amiloride (30 mg. per day) combined

| Drug | Day | Body weight (kg.) | Daily urinary output | |
|---|---|---|---|---|
| | | | Na, meq. | K, meq. |
| Control | | 76.4 | 84.3 | 63.8 |
| HCTZ | 1 | 75.1 | 267.8 | 114.4 |
| | 2 | 74.7 | 146.0 | 86.8 |
| | 3 | 74.3 | 97.2 | 98.2 |
| | 4 | 74.1 | 81.6 | 100.2 |
| | 5 | 73.9 | 70.0 | 94.8 |
| HCTZ plus amiloride | 1 | 73.8 | 177.8 | 35.2 |
| | 2 | 73.6 | 160.2 | 34.0 |

This table summarizes the results obtained when hydrochlorothiazide (HCTZ) is separately administered for five (5) days prior to the administration of the combination (HCTZ and amiloride). After the first day of administering the combination, the natiuretic excretion was significantly increased from 70 to 177.8 meq. per day while simultaneously reducing the potassium level from 94.8 to 35.2 meq. per day. The potassium excretion value is considerably less than control.

TABLE V

Mean diuretic response in five subjects to hydrochlorothiazide (50 mg. per day) followed by hydrochlorothiazide (50 mg. per day) and amiloride (30 mg. per day) combined.

| Drug | Day | Body weight (kg.) | Daily urinary output Na, meq. | K, meq. |
|---|---|---|---|---|
| Control | | 82.8 | 88.6 | 67.4 |
| HCTZ | 1 | 82.0 | 240.0 | 117.4 |
| | 2 | 81.3 | 124.3 | 113.7 |
| | 3 | 81.0 | 85.4 | 115.0 |
| | 4 | 80.8 | 81.8 | 124.0 |
| | 5 | 79.3 | 57.9 | 95.9 |
| HCTZ plus amiloride | 1 | 81.3 | 230.8 | 27.5 |
| | 2 | 80.7 | 181 | 19.1 |

This table summarizes the results obtained when hydrochlorothiazide is separately administered for five (5) days prior to the administration of the combination (HCTZ and amiloride). After the first day of administering the combination, the natiuretic excretion was significantly increased from 57.9 to 230.8 meq. per day while simultaneously reducing the potassium level from 95.9 to 27.5 meq. per day. The potassium excretion value is significantly less than control.

Medically, synergism is obtained when two drugs react favorably. With respect to separate administration of a potassium sparing diuretic and a sodium excreting diuretic, neither of the diuretics can be successfully administered over a period of time without causing undesirable effects on the patient. More specifically, when a sodium excreting diuretic is administered over a period of time, the patient excretes the necessary quantity of undesired $Na^+$ but in addition thereto excretes the desired $K^+$, thus subjecting the patient to a hypokalemia state. When a potassium sparing diuretic is administered separately over a period of time, the patient achieves the desired $K^+$ balance but the quantity of undesired $Na^+$ excretion is not obtained. Therefore, the favorable reaction existing between these classes of diuretics is that the potassium sparing diuretic potentiates the natiuretic effect of sodium excreting diuretics while simultaneously reversing the $K^+$ excretion to the desired positive level.

The present invention also contemplates that the guanidine type diuretic may be: (3,5-diamino-6-chloropyrazinamido)guanidine.

Representative examples to illustrate this invention are the following:

EXAMPLE 1

Combined dosage form in dry filled capsule

| | Per capsule, mg. |
|---|---|
| (3,5 - diamino - 6 - chloropyrazinoyl)guanidine hydrochloride | 10 |
| Hydrochlorothiazide | 50 |
| Magnesium stearate | 2 |
| Lactose | 223 |
| Mixed powders, total | 285 |

Mix all of the above ingredients, reduce to a No. 60 mesh powder and encapsulate, filling 285 mg. in each No. 2 capsule.

EXAMPLE 2

Combination dosage form in dry filled capsule

| | Per capsule, mg. |
|---|---|
| (3,5 - diamino - 6 - chloropyrazinoyl)guanidine hydrochloride | 10 |
| [4 - (2 - methylenebutyryl)-2,3-dichlorophenoxy] acetic acid; ethacrynic acid | 100 |
| Magnesium stearate | 2 |
| Lactose | 73.5 |
| Mixed powders, total | 185.5 |

Mix all of the above ingredients, reduce to a No. 60 mesh powder and encapsulate, filling 185.5 mg. in each No. 2 capsule.

If, in Example 1, chlorothiazide is substituted for hydrochlorothiazide, the amount of chlorothiazide would be ten times that of hydrochlorothiazide due to the decreased activity per mg. Also, if cyclothiazide is substituted for the hydrochlorothiazide the amount of cyclothiazide would be one-tenth that of hydrochlorothiazide due to the increased activity per mg. As the relative diuretic activity of each of the other thiadiazine diuretics mentioned above is known, the equivalent amount of it to be used is known; this is true for the other diuretics mentioned in the above group which includes dichlorophenamide.

If, in Example 2, one of the other mentioned phenoxyacetic acid diuretics is substituted for ethacrynic acid, it would be used in a greater or lesser amount depending upon its known relative diuretic acivity with respect to ethacrynic acid.

As to the pyrazinoylguanidine to be substituted in either Example 1 or Example 2 in place of the one specified, the equivalent amount to be used is indicated by its known relative activity.

Other examples are apparent from the above explanation that a different pyrazinoylguanidine class diuretic, a different phenoxyacetic acid class diuretic, or a different thiadiazine class diuretic or one of the above group of diuretics which includes dichlorphenamide, may be substituted in an amount to give an equivalent diuretic effect, based on their known individual activities when used alone. Examples 1 and 2 also serve to indicate other examples based on the specific examples. Representative of such other examples are the following and one or two tablets would be taken each day, preferably in subdivided doses spread over a 24-hour period.

EXAMPLE 3

| | Per capsule, mg. |
|---|---|
| (3,5 - diamino - 6 - chloropyrazinoyl)guanidine hydrochloride | 5 |
| Hydrochlorothiazide | 50 |
| Magnesium stearate | 2 |
| Lactose and mixed powders | 268 |
| Mixed powders, total | 325 |

Mix all of the above ingredients, reduce to a No. 60 mesh powder and encapsulate, filling 325 mg. in each No. 2 capsule.

EXAMPLE 4

| | Per capsule, mg. |
|---|---|
| (3,5 - diamino - 6 - chloropyrazinoyl)guanidine hydrochloride | 25 |
| Hydrochlorothiazide | 25 |
| Magnesium stearate | 2 |
| Lactose and mixed powders | 273 |
| Mixed powders, total | 325 |

Mix all of the above ingredients, reduce to a No. 60 mesh powder and encapsulate, filling 325 mg. in each No. 2 capsule.

EXAMPLE 5

| | Per capsule, mg. |
|---|---|
| (3,5 - diamino - 6 - chloropyrazinoyl)guanidine hydrochloride | 5 |
| Hydrochlorothiazide | 25 |
| Magnesium stearate | 2 |
| Lactose and mixed powders | 293 |
| Mixed powders, total | 325 |

EXAMPLE 6

| | Per capsule, mg. |
|---|---|
| (3,5 - diamino - 6 - chloropyrazinoyl)guanidine hydrochloride | 20 |
| Hydrochloroithiazide | 100 |
| Magnesium stearate | 2 |
| Lactose and mixed powders | 203 |
| Mixed powders, total | 325 |

Mix all of the above ingredients, reduce to a No. 60 mesh powder and encapsulate, filling 325 mg. in each No. 2 capsule.

EXAMPLE 7

| | Per capsule, mg. |
|---|---|
| (3,5 - diamino - 6 - chloropyrazinoyl)guanidine hydrochloride | 5 |
| Ethacrynic acid | 50 |
| Magnesium stearate | 2 |
| Lactose and mixed powders | 268 |
| Mixed powders, total | 325 |

Mix all of the above ingredients, reduce to a No. 60 mesh powder and encapsulate, filling 325 mg. in each No. 2 capsule.

EXAMPLE 8

| | Per capsule, mg. |
|---|---|
| (3,5-diamino - 6 - chloropyrazinoyl)guanidine hydrochloride | 15 |
| Ethacrynic acid | 75 |
| Magnesium stearate | 2 |
| Lactose and mixed powders | 233 |
| Mixed powders, total | 325 |

Mix all of the above ingredients, reduce to a No. 60 mesh powder and encapsulate, filling 325 mg. in each No. 2 capsule.

EXAMPLE 9

| | Per capsule, mg. |
|---|---|
| (3,5 - diamino - 6 - chloropyrazinoyl)guanidine hydrochloride | 10 |
| Ethacrynic acid | 50 |
| Magnesium stearate | 2 |
| Lactose and mixed powders | 263 |
| Mixed powders, total | 325 |

Mix all of the above ingredients, reduce to a No. 60 mesh powder and encapsulate, filling 325 mg. in each No. 2 capsule.

EXAMPLE 10

| | Per capsule, mg. |
|---|---|
| (3,5 - diamino - 6 - chloropyrazinamido)guanidine hydrochloride | 5 |
| Hydrochlorothiazide | 50 |
| Magnesium stearate | 2 |
| Lactose and mixed powders | 268 |
| Mixed powders, total | 325 |

Mix all of the above ingredients, reduce to a No. 60 mesh powder and encapsulate, filling 325 mg. in each No. 2 capsule.

EXAMPLE 11

| | |
|---|---|
| (3,5-diamino - 6 - chloropyrazinamido)gudanidine hydrochloride | 7.5 |
| Hydrochlorothiazide | 37.5 |
| Magnesium stearate | 2 |
| Lactose and mixed powders | 278 |
| Mixed powders, total | 325 |

Mix all of the above ingredients, reduce to a No. 60 mesh powder and encapsulate, filling 325 mg. in each No. 2 capsule.

EXAMPLE 12

| | Per capsule, mg. |
|---|---|
| (3,5 - diamino - 6 - chloropyrazinamido)guanidine hydrochloride | 10 |
| Hydrochlorothiazide | 50 |
| Magnesium stearate | 2 |
| Lactose and mixed powders | 263 |
| Mixed powders, total | 325 |

Mix all of the above ingredients, reduce to a No. 60 mesh powder and encapsulate, filling 325 mg. in each No. 2 capsule.

EXAMPLE 13

| | Per capsule, mg. |
|---|---|
| (3,5 - diamino - 6 - chloropyrazinamido)guanidine hydrochloride | 5 |
| Ethacrynic acid | 50 |
| Magnesium stearate | 2 |
| Lactose and mixed powders | 268 |
| Mixed powders, total | 325 |

Mix all of the above ingredients, reduce to a No. 60 mesh powder and encapsulate, filling 325 mg. in each No. 2 capsule.

EXAMPLE 14

| | Per capsule, mg. |
|---|---|
| (3,5 - diamino - 6 - chloropyrazinamido)guanidine hydrochloride | 15 |
| Ethacrynic acid | 75 |
| Magnesium stearate | 2 |
| Lactose and mixed powders | 233 |
| Mixed powders, total | 325 |

Mix all of the above ingredients, reduce to a No. 60 mesh powder and encapsulate, filling 325 mg. in each No. 2 capsule.

EXAMPLE 15

| | Per capsule, mg. |
|---|---|
| (3,5 - diamino - 6 - chloropyrazinamido)guanidine hydrochloride | 10 |
| Ethacrynic acid | 50 |
| Magnesium stearate | 2 |
| Lactose and mixed powders | 263 |
| Mixed powders, total | 325 |

Mix all of the above ingredients, reduce to a No. 60 mesh powder and encapsulate, filling 325 mg. in each No. 2 capsule.

EXAMPLE 16

| | Per capsule, mg. |
|---|---|
| (3 - amino - 5 - dimethylamino-6-chloropyrazinoyl) guanidine hydrochloride | 50 |
| Hydrochlorothiazide | 50 |
| Magnesium stearate | 2 |
| Lactose and mixed powders | 223 |
| Mixed powders, total | 325 |

Mix all of the above ingredients, reduce to a No. 60 mesh powder and encapsulate, filling 325 mg. in each No. 2 capsule.

EXAMPLE 17

| | Per capsule, mg. |
|---|---|
| (3 - amino - 5 - dimethylamino-6-chloropyrazinoyl) guanidine hydrochloride | 50 |
| Ethacrynic acid | 50 |
| Magnesium stearate | 2 |
| Lactose and mixed powders | 223 |
| Mixed powders, total | 325 |

EXAMPLE 18

| | Per capsule, mg. |
|---|---|
| (3,5-diamino-6 - chloropyrazinoyl)guanidine hydrochloride | 20 |
| Hydrochlorothiazide | 200 |
| Magnesium stearate | 2 |
| Lactose and mixed powders | 103 |
| Mixed powders, total | 325 |

Mix all of the above ingredients, reduce to a No. 60 mesh powder and encapsulate, filling 325 mg. in each No. 2 capsule.

EXAMPLE 19

| | Per capsule, mg. |
|---|---|
| (3,5-diamino-6 - chloropyrazinoyl)guanidine hydrochloride | 30 |
| Hydrochlorothiazide | 30 |
| Magnesium stearate | 2 |
| Lactose and mixed powders | 263 |
| Mixed powders, total | 325 |

Mix all of the above ingredients, reduce to a No. 60 mesh powder and encapsulate, filling 325 mg. in each No. 2 capsule.

EXAMPLE 20

| | Per capsule, mg. |
|---|---|
| (3,5-diamino-6 - chloropyrazinoyl)guanidine hydrochloride | 30 |
| Hydrochlorothiazide | 50 |
| Magnesium stearate | 2 |
| Lactose and mixed powders | 243 |
| Mixed powders, total | 325 |

Mix all of the above ingredients, reduce to a No. 60 mesh powder and encapsulate, filling 325 mg. in each No. 2 capsule.

EXAMPLE 21

| | Per capsule, mg. |
|---|---|
| (3,5-diamino-6 - chloropyrazinoyl)guanidine hydrochloride | 30 |
| Hydrochlorothiazide | 100 |
| Magnesium stearate | 2 |
| Lactose and mixed powders | 193 |
| Mixed powders, total | 325 |

Mix all of the above ingredients, reduce to a No. 60 mesh powder and encapsulate, filling 325 mg. in each No. 2 capsule.

EXAMPLE 22

| | Per capsule, mg. |
|---|---|
| (3,5-diamino-6 - chloropyrazinoyl)guanidine hydrochloride | 20 |
| Ethacrynic acid | 200 |
| Magnesium stearate | 2 |
| Lactose and mixed powders | 103 |
| Mixed powders, total | 325 |

Mix all of the above ingredients, reduce to a No. 60 mesh powder and encapsulate, filling 325 mg. in each No. 2 capsule.

EXAMPLE 23

| | Per capsule, mg. |
|---|---|
| (3,5-diamino-6 - chloropyrazinoyl)guanidine hydrochloride | 10 |
| Hydrochlorothiazide | 100 |
| Magnesium stearate | 2 |
| Lactose and mixed powders | 213 |
| Mixed powders, total | 325 |

Mix all of the above ingredients, reduce to a No. 60 mesh powder and encapsulate, filling 325 mg. in each No. 2 capsule.

EXAMPLE 24

| | Per capsule, mg. |
|---|---|
| (3,5-diamino-6 - chloropyrazinoyl)guanidine hydrochloride | 25 |
| Hydrochlorothiazide | 80 |
| Magnesium stearate | 2 |
| Lactose and mixed powders | 218 |
| Mixed powders, total | 325 |

Mix all of the above ingredients, reduce to a No. 60 mesh powder and encapsulate, filling 325 mg. in each No. 2 capsule.

EXAMPLE 25

| | Per capsule, mg. |
|---|---|
| (3,5-diamino-6-chloropyrazinoyl)guanidine hydrochloride | 12.5 |
| Hydrochlorothiazide | 40 |
| Magnesium stearate | 2 |
| Lactose and mixed powders | 270.5 |
| Mixed powders, total | 325 |

Mix all of the above ingredients, reduce to a No. 60 mesh powder and encapsulate, filling 325 mg. in each No. 2 capsule.

EXAMPLE 26

| | Per capsule, mg. |
|---|---|
| (3,5-diamino-6 - chloropyrazinoyl)guanidine hydrochloride | 20 |
| Hydrochlorothiazide | 35 |
| Magnesium stearate | 2 |
| Lactose and mixed powders | 268 |
| Mixed powders, total | 325 |

Mix all of the above ingredients, reduce to a No. 60 mesh powder and encapsulate, filling 325 mg. in each No. 2 capsule.

EXAMPLE 27

| | Per capsule, mg. |
|---|---|
| (3,5-diamino-6 - chloropyrazinoyl)guanidine hydrochloride | 15 |
| Hydrochlorothiazide | 25 |
| Magnesium stearate | 2 |
| Lactose and mixed powders | 283 |
| Mixed powders, total | 325 |

Mix all of the above ingredients, reduce to a No. 60 mesh powder and encapsulate, filling 325 mg. in each No. 2 capsule.

The numerous examples illustrate capsules and tablets, but it is apparent that the diuretic combination can as well be put up as mixed powders which would be swallowed as though the drugs were in a tablet in the same amount. Or, the common liquid preparations as aqueous or alcoholic suspensions or solutions could be made up so that swallowing a tablespoonful would administer the same amount as though one of the above capsules or tablets (or its scored piece) had been swallowed.

What is claimed is:

1. A composition for oral administration comprising amiloride hydrochloride and hydrochlorothiazide, wherein the ratio of amiloride hydrochloride to hydrochlorothiazide ranges from about 1:1 to 1:10 by weight of the composition.

2. A composition according to claim 1 wherein amiloride hydrochloride and hydrochlorothiazide are combined at a ratio of 1 to 10 by weight.

3. A composition for oral administration which comprises 5 mg. of amiloride hydrochloride and 50 mg. of hydrochlorothiazide.

4. A method of treating hypokalemia which comprises the oral co-administration of a therapeutically effective amount of amiloride hydrochloride and hydrochlorothiazide, to a patient suffering from a hypokalemia state, wherein the ratio of amiloride hydrochloride to hydrochlorothiazide ranges from about 1:1 to 1:10 by weight of the formulation.

5. A method according to claim 4 wherein amiloride hydrochloride and hydrochlorothiazide are at a ratio of 1:10 by weight.

6. A method according to claim 5 which contains 5 mg. of amiloride hydrochloride and 50 mg. of hydrochlorothiazide.

References Cited

UNITED STATES PATENTS

| 3,268,406 | 8/1966 | Cragoe et al. | 424—250 |
| 3,313,813 | 4/1967 | Cragoe | 260—250 |

OTHER REFERENCES

Grollman: Pharmacology & Therapeutics (1965), pp. 563–567.

STANLEY J. FRIEDMAN, Primary Examiner

U.S. Cl. X.R.

424—250, 317